(12) United States Patent
Breukelman et al.

(10) Patent No.: US 7,874,358 B2
(45) Date of Patent: Jan. 25, 2011

(54) METHOD FOR OIL SAND EXPLORATION AND DEVELOPMENT

(75) Inventors: William A. Breukelman, Mississauga (CA); Brian William Main, Toronto (CA); John Barry French, Oakville (CA)

(73) Assignee: Gedex Inc., Mississauga (CA)

( * ) Notice: Subject to any disclaimer, the term of this patent is extended or adjusted under 35 U.S.C. 154(b) by 171 days.

(21) Appl. No.: 12/213,969

(22) Filed: Jun. 26, 2008

(65) Prior Publication Data

US 2009/0000784 A1 Jan. 1, 2009

Related U.S. Application Data

(60) Provisional application No. 60/929,473, filed on Jun. 28, 2007, provisional application No. 60/929,963, filed on Jul. 19, 2007.

(51) Int. Cl.
*E21B 49/00* (2006.01)
*G01V 7/16* (2006.01)

(52) U.S. Cl. ............................. 166/250.16; 73/382 G

(58) Field of Classification Search ............ 166/250.01, 166/250.16; 73/382 R, 382 G; 702/5; 324/330
See application file for complete search history.

(56) References Cited

U.S. PATENT DOCUMENTS

| | | | | |
|---|---|---|---|---|
| 1,796,150 A | * | 3/1931 | Hamer | 73/382 R |
| 3,273,397 A | * | 9/1966 | Forward | 73/382 R |
| 3,722,290 A | * | 3/1973 | Weber et al. | 73/382 R |
| 3,731,537 A | * | 5/1973 | Trageser | 73/382 R |
| 4,068,160 A | * | 1/1978 | Hunt | 324/323 |
| 6,125,698 A | | 10/2000 | Schweitzer et al. | |
| 6,152,226 A | | 11/2000 | Talwani et al. | |
| 6,467,543 B1 | | 10/2002 | Talwani et al. | |
| 6,502,037 B1 | | 12/2002 | Jorgensen et al. | |
| 6,837,106 B2 | | 1/2005 | Etkin et al. | |
| 6,954,698 B2 | | 10/2005 | Tryggvason | |
| 7,090,014 B2 | | 8/2006 | Good et al. | |
| 7,360,419 B2 | * | 4/2008 | French et al. | 73/382 G |
| 7,542,850 B2 | * | 6/2009 | Humphrey et al. | 702/2 |

OTHER PUBLICATIONS

Clark, K.A., Alberta Geological Survey, Information Series 022 Bulk Densities, Porosities, and Liquid Saturations of Good Grade Athabasca Oil Sands (Document on enclosed CD).

(Continued)

*Primary Examiner*—Kenneth Thompson
(74) *Attorney, Agent, or Firm*—Bereskin & Parr LLP/S.E.N.C.R.L.,s.r.l.

(57) ABSTRACT

The invention provides a method of locating, in terrain containing oil sand deposits and also containing shale, clean oil sands deposits (i.e. those not containing significant shale) which are large enough for economic exploitation. The method includes flying a high sensitivity gravity gradiometer over the terrain and measuring at least one component, preferably the vertical component, of the local gravity gradient field at a number of points in a grid pattern on the terrain. The densities of sand and shale are normally approximately the same, making it difficult to distinguish them. However in an oil sands environment, there can be a sufficient difference in bulk density such that by using a very sensitive gravity gradiometer, or by otherwise reducing the noise signal using appropriate surveying methods, large clean oil sand deposits can be distinguished from other oil sand deposits not large enough for economic exploitation.

12 Claims, 4 Drawing Sheets

OTHER PUBLICATIONS

AEUB (Alberta Energy and Utilities Board) Athabasca Wabiskaw-McMurray Regional Geological Study, Dec. 31, 2003 (Document on enclosed CD).

Gray et al., Prediction of Shale Plugs between Wells in Heavy Oil Sands using Seismic Attributes, Natural Resources Research, vol. 15, No. 2, Jun. 2006.

Gray et al., Examination of wide-angle, multi-component, AVO attributes for prediction of shale in heavy oil sands: A case study from the Long Lake Project, Alta. Canada, 2004.

Foss, The resolution in geological mapping that can be expected from airborne gravity gradiometry. Encom Technology, SEG Int'l Exposition, Salt Lake City, Utah, Oct. 2002.

Nabighian et al., Historical development of the gravity method in exploration. 75th Anniversary SEG, Geophysics, vol. 70, No. 6 (Nov.-Dec. 2005), p. 63ND-89ND.

Dransfield et al., Gravity Gradiometry for Geophysical Prospecting, Exploration Geophysics (1991) 22, 107-110.

Pawlowski, Gravity Gradiometry in Resource Exploration, AOA Geophysics, Houston, Texas, Jan. 1998, The Leading Edge.

Cristall et al., Airborne Electromagnetic Inversion Applied to Oil Sands Exploration, UBC Geophysical Inversion Facility, 2004 CSEG National Convention.

Li, Density Anomaly Indicators and Application, Paradigm Geophysical, Calgary, Canada, SEG New Orleans 2006 Annual Meeting.

Li, A Study on Applicability of Density Inversion in Defining Reservoirs, Paradigm Geophysical, Calgary, Canada, SEG Houston 2005 Annual Meeting.

McLennan et al., Optimization of SAGD Well Elevation, 2006, Natural Resources Research, vol. 15, No. 2, Jun. 2006.

* cited by examiner

US 7,874,358 B2

METHOD FOR OIL SAND EXPLORATION AND DEVELOPMENT

PRIOR APPLICATION

This application claims the benefit of U.S. Provisional Application Ser. No. 60/929,473, filed Jun. 28, 2007 entitled "METHOD FOR OIL SAND EXPLORATION", and U.S. Provisional Application Ser. No. 60/929,963, filed Jul. 19, 2007 entitled "METHOD FOR OIL SAND EXPLORATION AND DEVELOPMENT".

FIELD

This invention relates to methods for oil sand exploration and development, including particularly methods for locating and differentiating areas with high shale content from areas of low shale content within oil sand deposits.

BACKGROUND

Oil sands (which are deposits of sand impregnated with bitumen, or viscous oil) are a well-known source of oil. For example, it has been estimated that approximately 175 billion barrels of bitumen can be recovered, using current technology, from the oil sands located in the province of Alberta, Canada. While some of the oil from the oil sands in Alberta can be and is produced by open-pit mining, unfortunately open-pit mining can reach only a small fraction of the available oil sand deposits. The bulk (approximately 81%) of the oil sand reserves established in Alberta is too deep below the surface to be mined and must be extracted using in situ techniques.

Several well-known methods are used for in situ recovery of bitumen from oil sands. These methods all involve substantial cost. For example, a primary method for in situ oil sands recovery of bitumen is "Steam Assisted Gravity Drainage" or SAGD. This method involves drilling two horizontal wells, the top well being used to inject high pressure steam into the oil sand deposit, and the bottom well being used to collect bitumen which has been heated by the steam to become less viscous and can therefore flow into the bottom well.

It is evident that before bitumen can be extracted from oil sand deposits which are buried below the ground surface, the required oil sand deposits must first be located. To economically justify the installation of bitumen extraction equipment, the oil sand deposit from which bitumen is being extracted must be sufficiently large. Typically the minimum size of an oil sand deposit which would justify installation and use of extraction equipment is 500 m long×500 m wide×30 m deep. These dimensions are approximate and can change with technology and according to a variety of factors (a larger volume could be required to justify stand alone production facilities).

In addition to the above minimum size requirement, there is also a requirement that the oil sand deposit be "clean". The reference to "clean" means that there should not be any significant quantity of shale present in the deposit. This is because if shale is present in the oil sand deposit, the shale will act as a barrier to both the flow of steam, and the flow of oil, and will severely restrict the volume of oil that can be recovered.

Locating clean oil sand deposits of at least the minimum size needed has in the past required drilling a systematic grid of core holes or exploration wells, and conducting two-dimensional seismic exploration, which can require clear cutting of vegetation. Drilling the exploration wells and conducting seismic, is extremely expensive and can disfigure the landscape. In addition, in some locations, such as northern Alberta, exploration wells can be drilled only at limited times of the year limiting the speed of exploration and development. However, to date there has been no means of determining volumes of clean sand aside from drilling.

SUMMARY

The applicant has determined that, contrary to the belief of experts in the field, buried deposits of clean oil sands of sufficient size for economic exploitation can be located by the use of gravity gradient surveying. This is a surprising result, since it is necessary for in situ development of oil sands to distinguish between "good oil sand deposits" which do not contain shale (and which can therefore be exploited), and "bad sand deposits" which contain significant shale (and which therefore cannot be exploited or are extremely difficult or uneconomic to exploit). At least partly because the density of sand and shale are approximately the same, experts in the field, when asked about the feasibility of using gravity gradient techniques for locating clean oil sand deposits, all replied that in their opinion, such techniques would not work.

The applicants have determined that for the reasons and under the circumstances set forth below, gravity gradient surveying can be used to locate economically viable deposits of oil sands. Therefore, in one aspect the invention provides a method of locating, in a selected terrain, a deposit of clean oil sand of a desired size, said deposit being beneath the surface of said terrain, said method comprising selecting an instrument for measuring one or more components or combinations of components of the gravitational gradient, moving said instrument over said terrain in a selected pattern to measure one or more components or combinations of components of the gravitational gradient at each of a plurality of points on said terrain to produce a measurement thereof at each point and recording the measurements at said points, to produce a gravitational gradient record, and analyzing said record to determine the presence or absence of said deposit.

BRIEF DESCRIPTION OF THE DRAWINGS

Preferred embodiments of the invention will be described in connection with the accompanied drawings. In the drawings.

DETAILED DESCRIPTION

Figure 1:
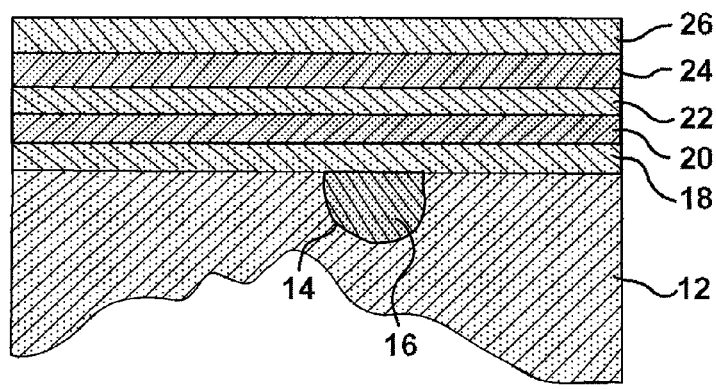
FIG. 1 is a cross-sectional view showing typical geology in which oil sand deposits are found.

Oil sand deposits are typically found in ancient fluvial estuarine systems. Over time river systems frequently formed over lows in a limestone basement, meandered, cut channels, rose and fell, flooded and deposited layers of sand and shale, creating geology similar to that shown in FIG. 1. In FIG. 1, the limestone basement is shown at 12, while a riverbed channel is shown at 14. The channel 14 contains an oil sand deposit 16.

The channel 14 can vary in width (e.g. from 100 m to 2 km) and can extend in length for many kilometers. The thickness of the stacked channels 16 can vary greatly. The thickness of the McMurray formation in northern Alberta, where these stacked channels often occur, varies from 0 m to approximately 100 m. The formation and oil sand channels can be located near ground surface, or can be at depths of several hundred meters.

As shown in FIG. 1, there may be sedimentary layers 18,20,22,24,26 of sand and shale and glacial till located above the channel sand. These layers are shown only by way of example and may vary.

Because the layers 18-26 are formed by a deposition process, they are usually stratified, i.e. they form a set of generally parallel layers. These layers may be tilted due to geological forces, thus causing the formation containing the oil sand channels to be buried in some areas and to outcrop the ground surface in other areas.

Figure 2:
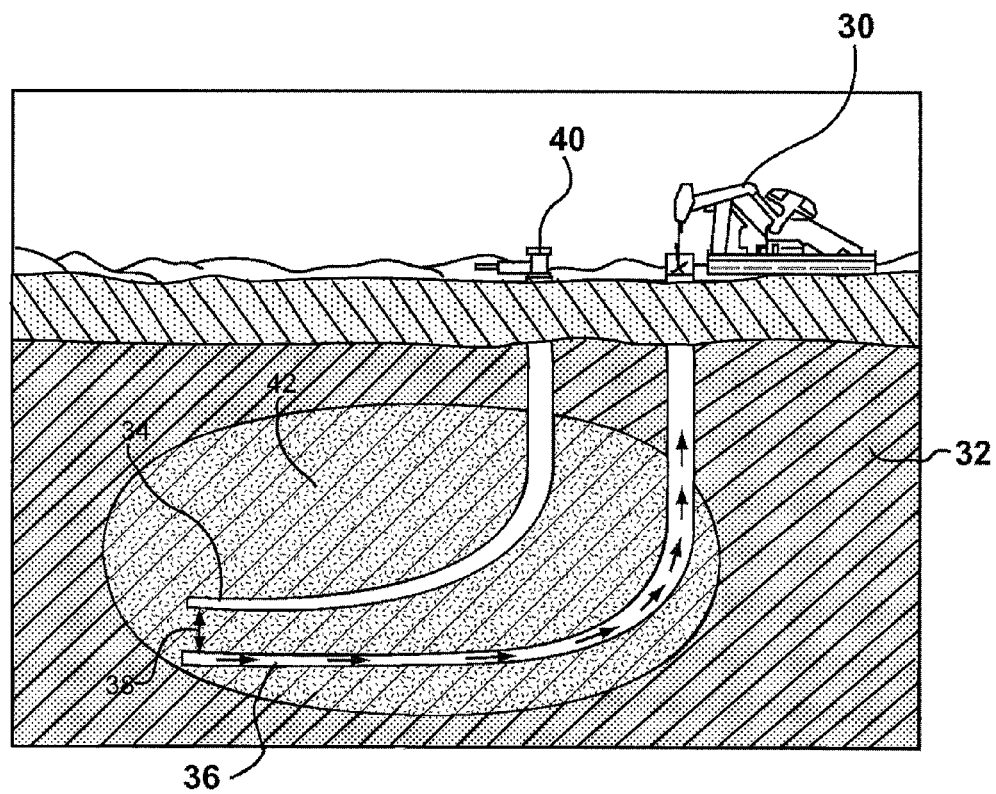
FIG. 2 is a diagrammatic cross-sectional view showing a SAGD installation for in situ extraction of bitumen from oil sands.

Reference is next made to FIG. 2, which shows schematically a SAGD production system 30 in common use today for in situ extraction of bitumen from a clean oil sand deposit 32. As shown, two horizontal wells 34, 36 are drilled in the clean oil sand deposit 32. The horizontal wells are separated by a small vertical distance 38 and are near the bottom of the clean oil sand deposit 32. The top horizontal well 34 is used to inject high pressure steam from a source 40. The steam rises to form a high temperature steam chamber 42 above the top well 34. Within the steam chamber 42, the heated bitumen becomes less viscous and flows by gravity to the lower horizontal well 36 where it is collected, along with the condensed water from the steam.

The SAGD process is currently becoming the method of choice for in situ production in the Athabasca oil sands. Another well-known recovery process is called "Cyclic Steam Stimulation" (CSS). CSS is a process in which steam is injected and bitumen produced in alternating sequences from the same well.

Both the SAGD and the CSS processes require clean oil sand deposits of sufficient volume. As previously noted, "clean sand" refers to sand without shale (or at least without any significant quantity of shale). If sufficient shale is present, it acts as a barrier to the flow of steam and oil and severely restricts the volume of oil that can be recovered. There must be enough clean sand to justify the costs of drilling, and of obtaining, installing and operating bitumen extraction equipment above the oil sand deposit.

As also previously noted, the minimum size of a clean oil sand deposit considered to be economically viable is approximately 500 m wide×500 m long×30 m deep. Larger deposits would of course also be suitable, and in fact are preferable and make the method more attractive.

Until now, the exploration process to delineate buried economically viable clean oil sand deposits has, as mentioned, required the costly, difficult and time-consuming process of drilling test wells, along with some seismic exploration. However the inventors have realized that even though sand and shale have essentially the same density (2.6 for each, relative to the density of water, which is 1), nevertheless clean sand (with little shale) can be distinguished from sand with lots of shale by gravity gradient measurements.

More specifically, it is found that in an oil sand deposit, clean oil sands have a porosity of approximately 30-35%, with a bitumen saturation of about 85% and a water saturation of about 15%. Thus the bulk density of bitumen saturated clean sand is approximately 2.05 to 2.13 (rather than 2.6 for the sand with significant shale).

In contrast, shales found with oil sands typically have a porosity of about 20%, with a water saturation of about 75%, resulting in a bulk density of approximately 2.28 (rather than 2.6 for the shale alone).

The difference in density between the bitumen saturated clean oil sand (2.13) and the bitumen containing shale (2.28) is approximately 0.15. When this difference in density is multiplied by the minimum volume of the clean oil sand deposit required for economic viability, (the minimum size being taken as 500 m×500 m×30 m, or 7.5 million $m^3$), the result is a difference in mass of more than one million tons. Depending on the background noise, this difference in mass can be detected by a gravity gradient instrument of suitable sensitivity, particularly since the oil sand deposits tend to be located at relatively shallow depths (e.g. not deeper than about 500 m), and gravity gradiometers excel at locating anomalies at shallow depths. (This is because gravitational gradient falls off with the third power of the distance between the instrument and the mass in question, while gravitational acceleration falls off only with the second power of that distance.)

Figure 3:
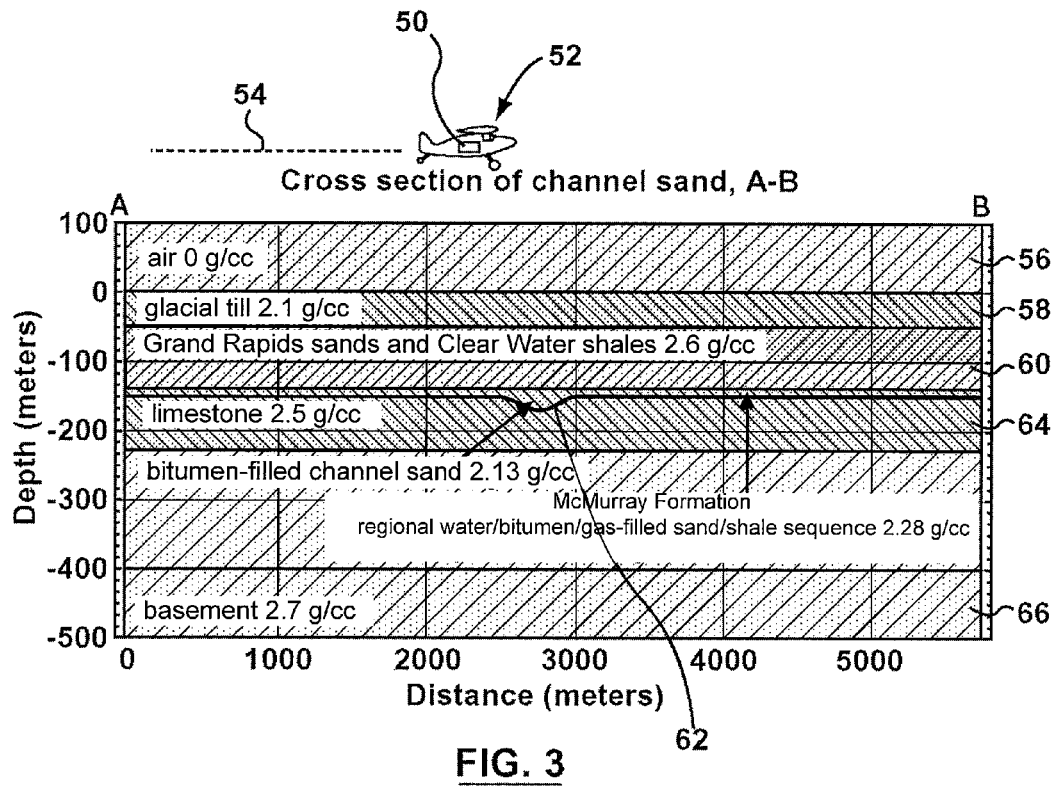
FIG. 3 is a cross-sectional view of a simplified model terrain showing sedimentary layers and a clean channel sand.

Reference is next made to FIG. 3, which shows a simplified model cross-section of a terrain. For greater clarification, terrain refers to an area of ground and the geology below.

In FIG. 3, a gravity gradiometer instrument 50 is shown as being located in an aircraft 52 which flies in a selected pattern 54. In the example shown in FIG. 3, pattern 54 is a rectangular grid in which measurements are made every 50 m along the aircraft's path, typically one measurement per second (depending on the aircraft's speed), while the parallel traverses of the aircraft 52 (i.e. the grid lines along which it is flying) may typically be 100 m apart and at an altitude of 100 m. The measurements can be made of various (one or all) of the gravity gradient components or combinations of them, but for illustrative purposes used here, calculations are performed from the measurements to determine the component of the gravitational gradient corresponding to the gradient in the vertical direction of the vertical component of the gravitational force vector. This component (which for purposes of brevity may be referred to in this description and in the claims as the "vertical component of the gravity gradient") is used for producing plots (since plots thus produced can be easier to interpret than plots made using other components of the gravity gradient). While the entire mass below the aircraft contributes to each measurement, in fact the mass directly below the aircraft contributes most significantly, and deeper portions of such mass contribute less than shallow portions, since the instrument response drops off with the third power of the distance between the instrument and the portion in question of the mass.

Beneath the aircraft 52 is located a layer 56 of air (density 0 g/cc), a layer 58 of glacial till (density 2.1 g/cc), a layer 60 of mixed sand and shale (density 2.6 g/cc), a bitumen-filled clean sand channel 62 (density 2.13 g/cc), a limestone "basement" 64 (density 2.5 g/cc), and further basement material 66 shown as having a density of 2.7 g/cc.

Figure 4:
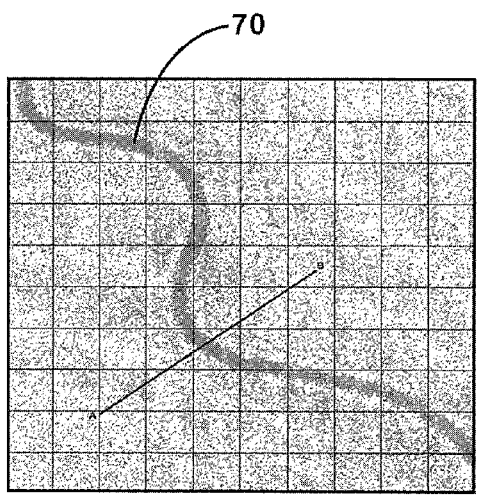
FIG. 4 is a plot showing the response of a gravity gradient instrument to the terrain of FIG. 3.

The gravity gradient signature of the clean sand channel 62 as measured by a gravity gradiometer 50 having a sensitivity during flight in the order of 1 Eotvos (this will be discussed in more detail shortly) and a response time of 1 second, is shown at 70 in FIG. 4. In FIG. 4 the meandering line 70 represents the clean sand channel 62, having a bulk density of approximately 2.13, while the remainder of the image in FIG. 4 represents the signature of the various layers, including particularly the sand and shale layer 60 (bulk density 2.6 g/cc), with only a much diminished influence from the bitumen-filled clean sand channel 62.

Figure 5:
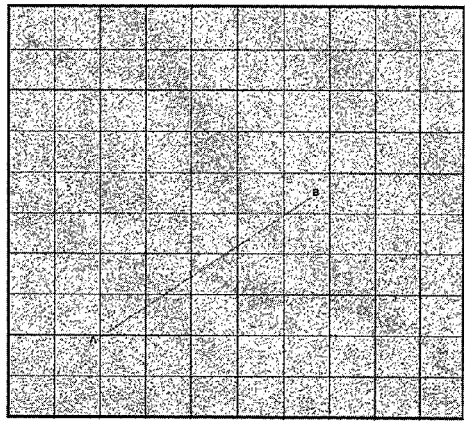
FIG. 5 is a plot similar to that of FIG. 4 but using a less sensitive gravity gradient instrument.

FIG. 5 shows a plot similar to that of FIG. 4 but taken with a gravity gradiometer having a sensitivity of approximately 7 Eotvos. It will be seen that with the higher noise level of the instrument used in FIG. 5, identification of the clean sand channel 62 is difficult or impossible, since the sand channel response line is largely obscured by noise.

Figure 6:
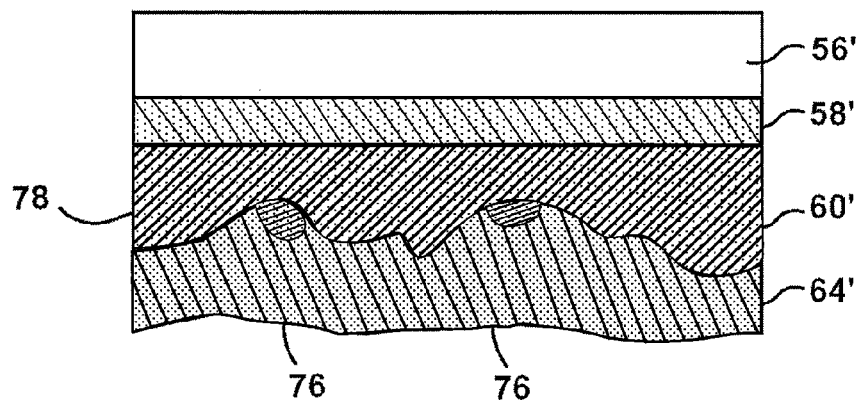
FIG. 6 shows a cross-section of another simplified model terrain, having topographical features in the limestone basement shown therein and a channel sand that has sections of clean sand and sand containing shale.
Figure 7:
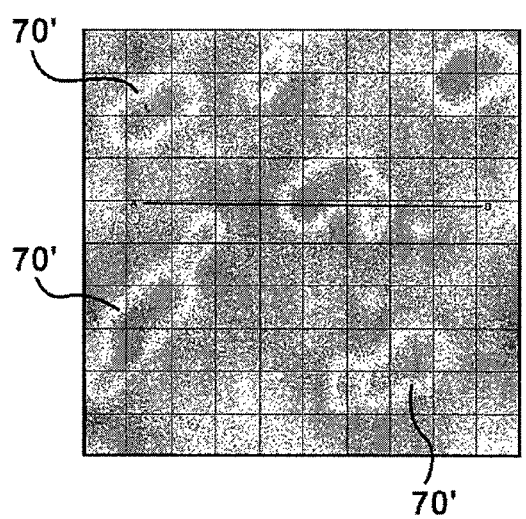
FIG. 7 is a plot showing the response of a gravity gradient instrument to the FIG. 6 model.
Figure 8:
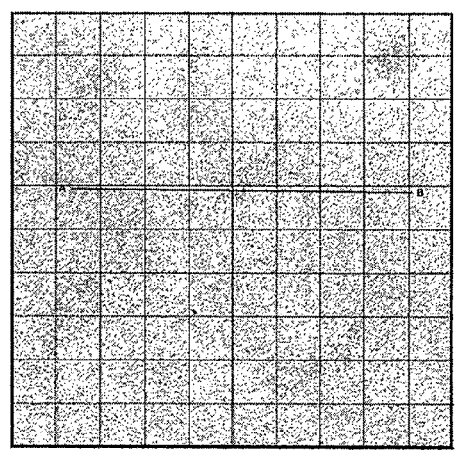
FIG. 8 is a plot similar to that of FIG. 7 but showing the response of a gravity gradient instrument with a higher intrinsic noise level.

Reference is next made to FIG. 6, which shows a model of another highly simplified terrain example. In FIG. 6, primed reference numerals indicate parts corresponding to those in the previous figures. In FIG. 6, the clean oil sand deposits have the form of distinct sand pockets 76 (rather than a continuous channel of sand). The clean sand pockets 76 each have a length and width of about 500 m×500 m. In addition they are assumed to be overlaid on a limestone basement 64' having topographic relief, as shown at 78 in FIG. 6. The varying topography of the limestone basement 64 complicates the gravity gradient plot as shown in FIG. 7, but it will be seen that when the gravity gradiometer 50 has a sensitivity of 1 Eotvos (or better), the clean sand deposits or pockets 76 can still be detected, as shown at 70'. This contrasts with FIG. 7, modeled using a gravity gradiometer having a sensitivity of 7 Eotvos. In FIG. 7 the 7 Eotvos system was not able to identify the clean sand deposits.

Although the 7 Eotvos system referred to above was not able to identify clean sand deposits because of its high noise level, the results could be improved by flying the 7 Eotvos gravity gradiometer 50' very slowly over the terrain being surveyed (e.g. by placing it in a helicopter) and then repeating the survey at least once and, if desired, several times. The multiple signal traces obtained from the multiple slow passes over the terrain can be combined to reduce the noise level, which will in some cases make it possible to see the clean sand deposits 76 using even a low sensitivity gravity gradiometer such as a 7 Eotvos instrument, or by using an instrument of sensitivity between 1 and 7 Eotvos. However where an instrument having sensitivity of 1 Eotvos or less is used, with a one second determination time for measuring and recording appropriate components or combinations of components of the local gravity gradient, so that the vertical component can be calculated, and if the instrument is flown at a speed of about 50 m per second, then multiple passes are normally unnecessary.

A number of groups are developing 1 Eotvos gravity gradiometers which may be suitable for practicing the methods of the invention. These companies include Gedex of Ontario, Canada; Arkex of the United Kingdom; the University of Western Australia, located in western Australia; Gravitec, of Australia, and others. Less sensitive instruments are currently available from companies including BHP Billiton of Australia and ArkeX of the United Kingdom. Both these companies are flying versions of a gravity gradiometer produced by Lockheed Martin.

Gravity gradiometers produced by various companies typically measure various components or combinations of components of the local gravitational gradient. For example, an instrument being developed by the applicant measures the following combinations of components of the gravitational gradient: $G_{zz}-G_{xx}$, or $G_{zz}-G_{yy}$, or $G_{xx}-G_{yy}$. One or more of these combinations of components are transformed (with some inherent error) to the vertical component $G_{zz}$, which is the easiest to interpret and is therefore the component of choice for interpretation.

The sensitivity of a gravity gradiometer can be specified in at least two somewhat different ways. In one such specification, a 1 Eotvos gravity gradiometer is taken to mean a gravity gradiometer in which the noise in the instrument has a root-mean-squared value of 1 Eotvos when filtered by a low-pass filter with a bandwidth of 1 hertz. A second definition or specification of a 1 Eotvos gravity gradiometer is an instrument in which a signal of 1 Eotvos produced by the instrument in response to the instrument's exposure to a subterranean density anomaly may readily be distinguished from the background noise (so that the background noise is much less than 1 Eotvos). Either of these specifications may be used in the present case, so long as the instrument generates a signal which is sufficiently distinguished from the background noise so that a subterranean deposit of interest can be distinguished from other deposits when the instrument is used in a survey, with appropriate survey methods.

It will be noted that sand channels tend to typically form over lows in the limestone basement 64 (since rivers cut into their beds), so variations in the limestone basement topography can reinforce rather than reduce the signal from the clean sand channel (since the contribution to the gravity gradient of the basement is lower at these greater distances from the instrument 50). In addition, natural gas may migrate to the upper layers and is often present above bitumen-filled sands. This will also contribute to a lower gravity gradient above the clean sand channel, although the gas may also migrate to and be located in other areas which will complicate interpretation.

Figure 9:
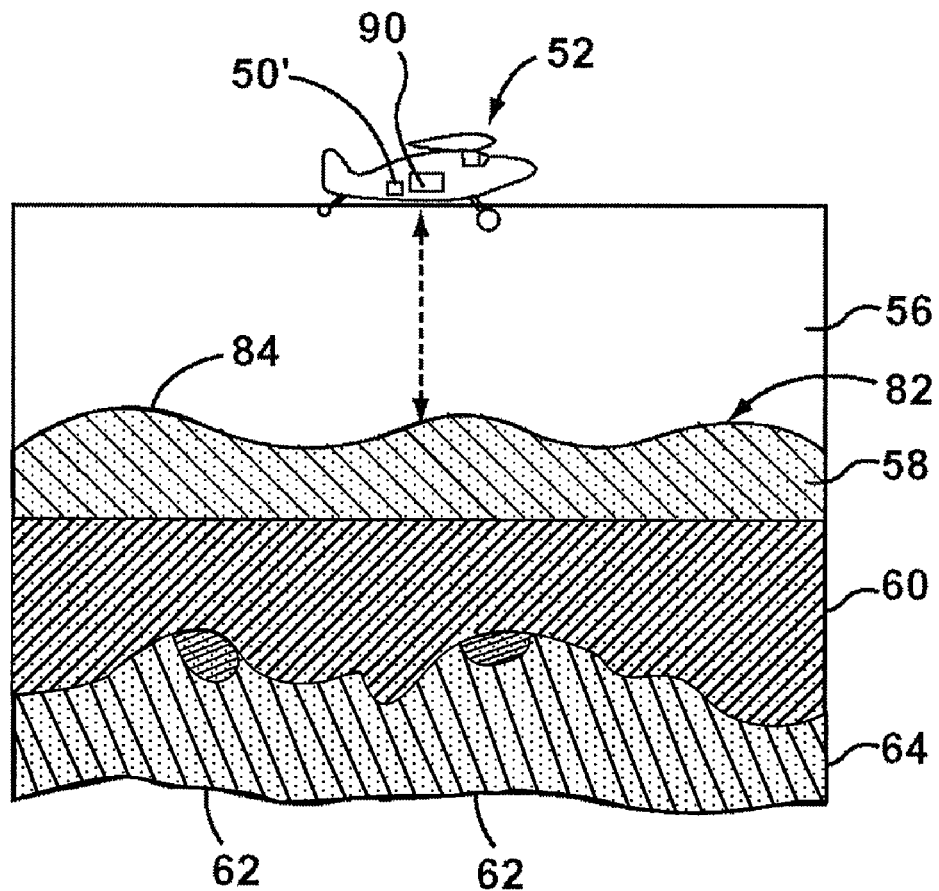
FIG. 9 is a cross-sectional view showing another model terrain having topographical features in its upper surface, namely rolling hills.

If desired, additional information can be used to help in identifying the clean sand deposits or channels. For example (see FIG. 9), if the surface or topography 82 of the terrain being explored varies (e.g. rolling hills), as shown at 84 in FIG. 9, then the aircraft 52 can be fitted with a LIDAR or laser altimeter 90 which provides a measurement of the topography 82. The contribution of the topography can be subtracted from the gravity gradient signal during processing. (The use of LIDAR to measure altitude has been described in a number of patents, including U.S. Pat. No. 6,804,608 B2 issued Oct. 12, 2004.) Similarly, if seismic or other data is available, it may be used to further assist in interpretation and identification of gravity gradients associated with clean oil sand deposits.

Although the SAGD extraction process has been referred to in the preceding description as a preferred method for in situ production in the Athabasca oil sands, various other production techniques are known and/or are being developed. One well-known technique, as previously mentioned, is Cyclic Steam Stimulation (CSS), which involves injecting very high pressure steam and producing bitumen in alternating sequences from the same well. CSS is less sensitive then SAGD to layers of shale in the sand, since the mechanical forces produced by the high pressure steam can cause gaps to form in the shale layers. The steam can penetrate through these gaps, and heat the bitumen which then also flows through the gaps. The steam pressure used in SAGD is lower than that used in CSS, so that SAGD does not have this capability. In the SAGD process, a layer of shale as thin as about 1 cm can seriously obstruct the flow of steam and bitumen and can prevent recovery of the bitumen above such layer.

While the interfering material referred to in the prior description has been described as "shale", it will be understood that there are different kinds of shale, depending on the constitution of the particles forming the shale. In addition, in its early stages (before the water has been compressed out of it), the shale may be referred to as mudstone or even simply as "mud". All of these variations and materials are intended to be included in the meaning of the word "shale" as used in this application.

While typical figures for the bulk porosity, bitumen saturation and water saturation of clean oil sands, and for the porosity and water saturation of shale have previously been provided in this description, it will be realized that these figures can vary. However, provided that the mass difference between the two sets of materials is still sufficient to be detected by the gravity gradiometer, then the methods of the invention may still be used.

SAGD and CSS are production methods which belong to the general category of "Thermal Methods". Other methods of production available include "Flame Front Methods", also called "Fire Flood Methods".

One typical fire flood method is known as "Toe-to-Heel Air Injection" (THAI). THAI involves injecting oxygen or air from one ventral well at the toe of a horizontal well, into bitumen-containing sand deposits, then igniting the resulting oxygen/bitumen mixture to generate heat in situ, resulting in heating of the remaining bitumen, facilitating its flow and recovery. THAI and other flame front or fire flood methods (which are still experimental) may be less sensitive then the SAGD process to horizontal shale layers, because by injecting oxygen at various depths through a hole in the injection well, THAI may be able to inject oxygen between the shale layers, so that each bitumen layer can be separately oxygenated and ignited.

Another fire flood method available is solvent injection (SOLVEX). SOLVEX involves augmenting the steam injected in the SAGD and/or CSS processes, with a solvent that can dissolve bitumen, such as liquid propane or butane. The resulting solution has a reduced viscosity, aiding in flow of the bitumen solution to the recovery well, and thus assisting recovery of the dissolved bitumen. In addition, if the solvent vaporizes in part and if the vapors are ignited, the heat generated will further lower the bitumen viscosity so that the bitumen can flow to the recovery location.

As indicated above, the CSS, THAI and SOLVEX processes are inherently less sensitive to shale layers between the bitumen bearing sands then is the SAGD process. Nevertheless the CSS, THAI and SOLVEX processes still perform better (i.e. they achieve a higher yield of bitumen extraction) for "clean sand" deposits then they do for deposits with extensive shale layering. It is therefore economically advantageous for operators to know in advance which area of their deposit has the cleanest sand, since extraction from areas of cleaner sand (as contrasted with areas having substantial shale layering) will tend to have a lower cost for a given bitumen yield. It will be realized that it is preferable to achieve higher yields as early as possible in the extraction process. By using the exploration methods disclosed in this application, operators may determine which areas of a deposit contain the cleanest sand. They can then begin the production process by first extracting bitumen from the cleanest sand using lower cost production methods appropriate to that type of deposit, while planning to subsequently use other extraction methods for areas of the deposit with higher shale concentrations. In that way, the operator can more quickly recover his investment with less likelihood of leaving "stranded bitumen", i.e. bitumen which is between layers of shale and cannot be recovered easily or at all.

It will be realized that while the methods of the invention can distinguish between sand areas which are relatively free of shale, and areas which have a relatively substantial amount of shale layering, it is more difficult to distinguish between sand areas which have only a small difference in the amount of shale that they contain. The size of the difference in shale content which can be detected will depend on the sensitivity of the gravity gradiometer used and on the surveying methods employed.

Methods as previously described may also be used to map the steam or other gas chambers which are formed when steam, propane or butane (when ignited), oxygen, air or other gas is injected into the oil sand from a configuration of injector wells. (The injector wells are usually located around the borders of the oil sand deposit from which bitumen is to be extracted, and drive steam toward the center of the deposit in order to leave as little stranded bitumen as possible.) When the steam or other gas (which can be the product of combustion) expands within the oil sand, a volume or chamber is created having a much lower density than that of the surrounding oil sand. This density difference can be detected by the gravity gradiometer at repeated periodic intervals, i.e. repeated surveys are conducted at desired intervals. The results of each survey are mapped, so that the operator can control the extraction process. In effect, this technique allows the operator to "see" the changing shape and size of the gas-containing chambers as they expand toward each other, even though these chambers are underground. This allows better control over the extraction process.

While preferred embodiments of the invention have been described, it will be realized that various changes can be made within the scope of the invention.

The invention claimed is:

1. A method of locating, in a selected terrain, a deposit of clean oil sand of a desired size, said deposit being beneath the surface of said terrain, said method comprising selecting an instrument for measuring one or more components or combinations of components of the gravitational gradient, moving said instrument over said terrain in a selected pattern to measure one or more components or combinations of components of the gravitational gradient at each of a plurality of points on said terrain to produce a measurement thereof at each point and recording the measurements at said points, to produce a gravitational gradient record, and analyzing said record to determine the presence or absence of said deposit; wherein said deposit contains sand of density approximately 2.6 g/cc, and said terrain also contains shale deposits also of density approximately 2.6 g/cc.

2. A method according to claim 1 wherein in the step of analyzing, the vertical component of said gravitational gradient corresponding to the gradient in the vertical direction of the vertical component of the gravitational force vector is determined for each of said points.

3. A method according to claim 2 wherein said instrument has a sensitivity of 1 Eotvos or better.

4. A method according to claim 1 wherein said deposit is a meandering channel of oil saturated clean sand.

5. A method according to claim 1 wherein said sand has a porosity of approximately 30-35% with bitumen saturation of approximately 85% and water saturation of approximately 15%, and having a resultant bulk density of approximately 2.05 to 2.13, and said shale has a porosity of approximately 20% with a water saturation of about 75%, having a resultant bulk density of approximately 2.28.

6. A method according to claim 5 and including the step of determining the minimum size for said deposit large enough to economically justify extracting oil therefrom, and marking such deposits.

7. A method according to claim 6 including the step of using additional information relating to said terrain to aid in marking said deposit.

8. A method according to claim 7 wherein said additional information includes the topography of said terrain.

9. A method according to claim 8 wherein said additional information includes information concerning the topography of a limestone basement or other sedimentary layers in said terrain.

10. A method according to claim 7 wherein said additional information includes information concerning deposits of natural gas in said terrain.

11. A method of differentiating, in a selected terrain, a first deposit of clean oil sand of a desired size from a second deposit of oil sand containing shale layering therein, said first and second deposits being beneath the surface of said terrain, said method comprising selecting an instrument for measuring at least one or more components or combinations of components of the gravitational gradient, moving said instrument over said terrain in a selected pattern to measure one or more components or combinations of components of the gravitational gradient at a plurality of points on said terrain to produce a measurement thereof at each point, recording said measurements at said points to produce a gravitational gradient record, the sand in said first deposit and the shale in said second deposit being sufficiently different that the bulk porosity of each differs such that the mass difference between said first and second deposits is large enough to be detected by analysis of said measurements, and then analyzing said record to determine the presence of and to distinguish apart said first and second deposits.

12. A method according to claim 11 wherein in the step of analyzing, the vertical component of said gravitational gradient corresponding to the gradient in the vertical direction of the vertical component of the gravitational force vector is determined for each of said points.

\* \* \* \* \*